United States Patent
Kim et al.

(10) Patent No.: US 8,119,029 B2
(45) Date of Patent: Feb. 21, 2012

(54) PHOSPHATE NANO PHOSPHOR AND METHOD OF PREPARING THE SAME

(75) Inventors: Tae-gon Kim, Seoul (KR); Tae-hyung Kim, Seoul (KR); Shin-hoo Kang, Seoul (KR); Seoung-jae Im, Seoul (KR)

(73) Assignees: Samsung Electro-Mechanics Co., Ltd. (KR); Seoul National University Industry Foundation (KR)

( * ) Notice: Subject to any disclaimer, the term of this patent is extended or adjusted under 35 U.S.C. 154(b) by 626 days.

(21) Appl. No.: 12/262,429

(22) Filed: Oct. 31, 2008

(65) Prior Publication Data

US 2009/0114880 A1    May 7, 2009

(30) Foreign Application Priority Data

Nov. 1, 2007    (KR) .................. 10-2007-0111051

(51) Int. Cl.
*C09K 11/71*    (2006.01)
(52) U.S. Cl. ..... 252/301.4 P; 252/301.6 P; 252/301.4 H
(58) Field of Classification Search ............ 252/301.4 P, 252/301.6 P, 301.4 H
See application file for complete search history.

(56) References Cited

U.S. PATENT DOCUMENTS

| | | | | |
|---|---|---|---|---|
| 3,663,473 A * | 5/1972 | Sausville | ............... | 252/301.6 P |
| 3,843,556 A * | 10/1974 | Panson et al. | ........... | 252/301.6 P |
| 4,038,204 A * | 7/1977 | Wachtel | ................ | 252/301.4 P |
| 4,527,087 A * | 7/1985 | Taya et al. | ................ | 313/487 |
| 7,008,557 B2 * | 3/2006 | Okada et al. | ........... | 252/301.4 R |
| 7,214,330 B2 * | 5/2007 | Nagashima et al. | ... | 252/301.4 R |
| 2001/0043042 A1 * | 11/2001 | Murazaki et al. | ............ | 313/483 |
| 2002/0047510 A1 * | 4/2002 | Bechtel et al. | ............... | 313/485 |
| 2003/0030375 A1 * | 2/2003 | Nakada et al. | ............... | 313/582 |

* cited by examiner

*Primary Examiner* — Carol M Koslow
(74) *Attorney, Agent, or Firm* — Cantor Colburn LLP (57) ABSTRACT

Provided is a phosphate nano phosphor with a mean particle diameter of 100 to 3000 nm. Also provided is a method of preparing a nano phosphor, the method comprising: dissolving two or more species of metal precursor compounds in water, and then adjusting the pH to prepare an aqueous solution of pH 4-10; coprecipitating the aqueous solution by mixing with a phosphate precursor aqueous solution with the pH adjusted to 7-12; and redispersing the particles obtained from the coprecipitation in water or polyol solvent, and then heat treating the particles. The phosphate nano phosphor according to the present invention has superior light emission efficiency compared with conventional nano phosphors.

10 Claims, 6 Drawing Sheets

Nano $(Sr_{0.88}Ca_{0.1}Eu_{0.02})_2P_2O_7$

FIG. 5

Nano $(Sr_{0.88}Ca_{0.1}Eu_{0.02})_2P_2O_7$

PHOSPHATE NANO PHOSPHOR AND METHOD OF PREPARING THE SAME

This application claims the benefit of Korean Patent Application No. 10-2007-0111051, filed on Nov. 1, 2007, in the Korean Intellectual Property Office, the disclosure of which is incorporated herein in its entirety by reference.

BACKGROUND OF THE INVENTION

1. Field of the Invention

Disclosed herein is a phosphate nano phosphor and a method of preparing the same.

2. Description of the Related Art

Phosphors are materials that emit light by energy stimulation, and are used in devices such as light sources for mercury phosphor lamps and mercury-free phosphor lamps, electron emitting devices, and plasma display panels. Phosphors are expected to be used in the development of new multimedia devices.

Nano phosphors, referring to nano-sized phosphors, have the ability to reduce light scattering effects, compared with conventional bulk-sized phosphors.

It is desirable for nano phosphors to have a small particle size, a good separation between particles, and good light emission efficiency. However, when producing small and well-separated phosphors, the generated light emission efficiency is generally very low, and when calcination temperature or time is increased in order to increase the light emission efficiency, coagulation occurs among phosphor particles, such that the phosphor particles are not nano-sized anymore. This coagulation upon calcinations represents a technical drawback in the field of nano phosphor production. In order to overcome such a drawback, heat spraying and laser crystallization methods have been suggested as alternative methods of increasing light emission efficiency. Despite having high quality characteristics, however, uses of such methods are limited due to high operating and equipment costs, and difficulty in scale-up manufacturing.

SUMMARY OF THE INVENTION

Disclosed herein is a phosphate nano phosphor with excellent light emission efficiency.

Disclosed herein too is an improved method of preparing a nano phosphor, and capable of synthesizing a nano phosphor with excellent light emission efficiency.

Disclosed herein too is a nano phosphor prepared using the method of preparing a nano phosphor.

Disclosed herein too is a phosphate nano phosphor with a mean particle diameter of 100 to 3000 nm.

In particular, the phosphate nano phosphor may be represented by Formula 1 below:

$$M_a P_b O_c A_d \quad \text{(Formula 1)}$$

wherein M is $M1_x M2_y M3_{(1-x-y)}$, and M1, M2, and M3 are each selected from the group consisting of Mg, Ca, Sr, Ba, Zn and Mn, and $0 \leq x \leq 1$, and $0 \leq y \leq 1$; A is $A1_z A2_w A3_{(1-z-w)}$, A1, A2, and A3 are each selected from the group consisting of F, Cl, Br, I, and OH, and $0 \leq z \leq 1$, and $0 \leq w \leq 1$; and $1.5 < a < 5.5$, $1.5 < b < 3.5$, $6 < c < 13$, and $0 \leq d \leq 2$.

An activator is $B1_p B2_g B3_{(1-p-g)}$, and B1, B2, and B3 are selected from the group consisting of Eu, Mn, Ce, Pr, Dy, Tm, Tb, Yb, Sm, Er, Bi, Sb and Sn, and $0 \leq p \leq 1$ and $0 \leq g \leq 1$.

Disclosed herein too is a method of preparing a nano phosphor, including: dissolving two or more species of metal precursor compounds in water, and then adjusting the pH to prepare an aqueous solution of pH of about 4 to about 10; coprecipitating the aqueous solution by mixing with a phosphate precursor aqueous solution with the pH adjusted to about 7 to about 12; and redispersing the particles obtained from the coprecipitation in water or polyol solvent, and then heat treating the particles.

Disclosed herein too is a nano phosphor prepared using the method of preparing the nano phosphor of the present invention.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown.

Disclosed herein is a phosphate nano phosphor with a mean particle diameter of 100 to 3000 nm, and having excellent light emission characteristics.

It is desirable for the nano phosphors to display a small particle size, a separation between particles, and a good light emission efficiency. However, when producing small and well-separated phosphors, the light emission efficiency is generally very low. However, the phosphate nano phosphors disclosed herein have a homogenous chemical composition, and display a good light emission efficiency. The phosphate nano phosphor may be a compound represented by Formula 1 below. The formula represents a phosphor including a PO$_4$ unit in a host crystal structure.

$$M_a P_b O_c A_d \quad \text{(Formula 1)}$$

wherein M is $M1_x M2_y M3_{(1-x-y)}$, and M1, M2, and M3 are each selected from the group consisting of Mg, Ca, Sr, Ba, Zn and Mn, and $0 \leq x \leq 1$, and $0 \leq y \leq 1$; A is $A1_z A2_w A3_{(1-z-w)}$, A1, A2, and A3 are each selected from the group consisting of F, Cl, Br, I, and OH, and $0 \leq z \leq 1$, and $0 \leq w \leq 1$; and $1.5 < a < 5.5$, $1.5 < b < 3.5$, $6 < c < 13$, and $0 \leq d \leq 2$ and where P is phosphorus and O is oxygen.

An activator is $B1_p B2_g B3_{(1-p-g)}$, and B1, B2, and B3 are selected from the group consisting of Eu, Mn, Ce, Pr, Dy, Tm, Tb, Yb, Sm, Er, Bi, Sb and Sn, and $0 \leq p \leq 1$ and $0 \leq g \leq 1$.

Specific examples of phosphate nano phosphors represented by Formula 1 include $Sr_2P_2O_7:Eu^{2+}$, $Sr_2P_2O_7:Eu^{2+}$, $Mn^{2+}$, $Sr_5(PO_4)_3Cl:Eu^{2+}$, $Sr_5(PO_4)_3(Cl,F):Eu^{2+}$, $Mn^{2+}$, $Sr_5(PO_4)_3Cl:Sn^{2+}$, $Sr_5(PO_4)_3Cl:Sb^{2+}$, $Sr_5(PO_4)_3(Cl,F):Sb^{2+}$, $Mn^{2+}$, $Ca_5(PO_4)_3Cl:Eu^{2+}$, $Ca_5(PO_4)_3(Cl,F):Eu^{2+}$, $Mn^{2+}$, and $Ca_3(PO_4)_2:Eu^{2+}$.

Preferably, the difference between 10%-point of cumulative particle size distribution (D10) and 90%-point of cumulative particle size (D90) may be about 200 to about 1000 nanometers (nm).

D10 and D90 may be measured using a conventional method, for example, using transmission electron microscope (TEM) and scanning electron microscope (SEM) images. As another example, D10 and D90 may be easily measured using a measuring device such as a Zetamaster (Malvern), analyzing the data to count the number of particles for each size range, and then calculating the corresponding values of D10 and D90.

In the phosphate nano phosphor, D10 may be preferably about 200 to about 800 nm and D90 may be preferably about 500 to about 1500 nm.

A large difference in values between D10 and D90 means that the size distribution of each particle falls across a wide range, and a small difference between D10 and D90 means that the size distribution of each particle falls across a narrow range. Therefore, if the difference between the D10 and D90 exceeds about 1000 nm, many clusters are produced among particles, meaning that many particles with large sizes are included. A zero difference between D10 and D90 means that all particles are almost equally sized, which is not useful in reality. The difference between D10 and D90 of the phosphate nano phosphor is about at least about 200 nm.

The nano phosphor may be used in all types of lighting and display devices using phosphors, such as cold cathode fluorescent lamps (CCFLs), light emitting diodes (LEDs), and plasma display panels (PDPs).

Disclosed herein too is a method of preparing a nano phosphor, including dissolving two or more species of metal precursor compounds in water, and then adjusting the pH to prepare an aqueous solution of pH about 4 to about 10; co-precipitating the aqueous solution by mixing with a phosphate precursor aqueous solution with the pH adjusted to about 7 to about 12; and redispersing the particles obtained from the coprecipitation in water or polyol solvent, and then heat treating the particles.

First, a metal precursor compound forming a phosphor is prepared, which is either dissolved directly or dissolved using an acid or a base to prepare a corresponding aqueous solution. To the resulting aqueous solution, an acid or a base is added to adjust the pH to about 4 to about 10, preferably about 5 to about 9, and more preferably about 6 to about 7. Separately, a phosphate precursor aqueous solution is prepared. Examples of compounds that may be used as the phosphate precursor include $(NH_4)_2HPO_4$, $NH_4H_2PO_4$ and $H_3PO_4$, and the pH may be adjusted using a basic solution such as $NH_4OH$, $NaOH$, $KOH$, and $Na_2CO_3$ solutions based on the pH of the precursor aqueous solution.

Next, the aqueous solutions are mixed together and coprecipitated.

The precipitants resulting from coprecipitating the mixed aqueous solutions are separated from the solution, and particles obtained thereby are redispersed in water, polyol solution or a mixture thereof, and are heat-treated. The precipitants are separated from the water, polyol solution or a mixture thereof again, and dried to prepare the final phosphor. Examples of the polyol solution include ethylene glycol, diethylene glycol, and glycerol, and mixtures thereof.

The heat-treatment may be performed at a temperature of about 150 to about 250° C. for about 30 minutes to about 100 hours. Preferably, after the separation of the precipitants following the heat-treatment, calcination may also be performed on the precipitants. The calcination may be performed under air atmosphere or reducing atmosphere of a mixed gas of $H_2$ and $N_2$ or Ar, at about 700 to about 1300° C. for about 30 minutes to about 10 hours.

The acid used for dissolving the metal precursor compound or for adjusting the pH of aqueous solutions may include inorganic and organic acids. Examples of the acid include $HNO_3$, $HCl$, $H_2SO_4$, acetic acid, butyric acid, palmitic acid, oxalic acid, tartaric acid, and a combination comprising at least one of the foregoing acids. The base may include $NH_4OH$, $NaOH$, $KOH$, $Na_2CO_3$, and a combination comprising at least one of the foregoing bases.

In the metal precursor compound aqueous solution, the metal precursor compound may include carbonates, nitrates, chlorides, hydroxides, oxalates, acetates, or oxides of Mg, Ca, Sr, Ba, Zn, Mn, Eu, Ce, Pr, Dy, Tm, Tb, Yb, Sm, Er, Bi, Sb or Sn, and may be two or more compounds selected therefrom.

Coprecipitation in the method of preparing the nano phosphor according to the current embodiment may be a reverse strike coprecipiation having high crystallization driving power, such that the nano phosphor particles synthesized thereby have a small size, and a homogenous distribution.

The higher the crystallization driving power is, the smaller and more homogenous the precipitated particles become.

Figure 2:
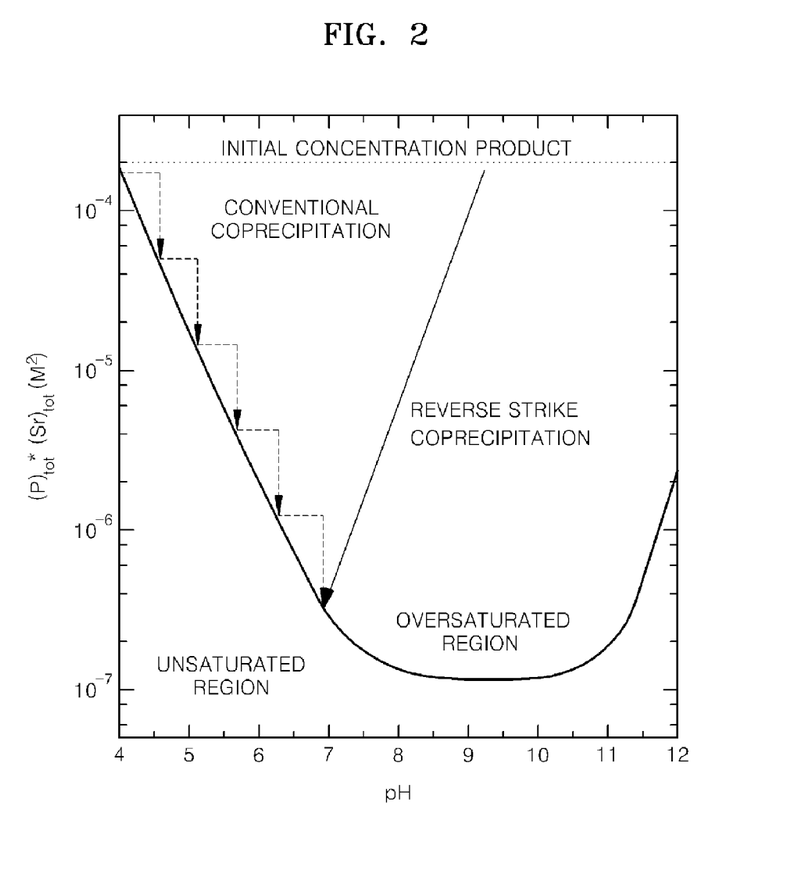
FIG. 2 is a graph illustrating a solubility isotherm curve with respect to pH of β-SrHPO$_4$, a precursor of Sr$_2$P$_2$O$_7$ phase.

FIG. 2 is a graph illustrating a solubility isotherm curve (ref. T. G. Kim et. al. Inorg. Chem. 44, 9895 (2005)), with respect to pH of $\beta$-$SrHPO_4$, a precursor of $Sr_2P_2O_7$ phase. The dotted line represents a pathway of conventional coprecipitation, and the solid line represents a pathway of reverse strike coprecipitation.

Referring to FIG. 2, in the case where reverse strike coprecipitation at about pH 9 is used, precursors can be synthesized with high crystallization driving power across the entire solution homogenously, while in the case where precursors are synthesized by adding a basic solution such as ammonia to a solution with a low pH, the crystallization driving power is relatively low, and the crystallization driving power may not be formed homogenously in all parts of the solution, thereby causing difficulty in synthesizing a high-quality precursor.

Moreover, the reverse strike coprecipitation used in the method of preparing the nano phosphor is more economical compared to conventional heat-spraying method or a laser crystallization method.

Furthermore, in the method of preparing the nano phosphor the nano phosphor synthesized by water heating or solvent heating the precursor prior to calcination further stabilizes the phosphor and thereby minimizes the coagulation between particles during calcination. As a result, even after the calcination at high temperature, the nanometer sizes of the particles can be maintained.

Without being limited to theory, the precipitants obtained by reverse strike coprecipitation are water-heated or solvent-heated so that the thermodynamic stability of each particle is enhanced, minimizing the coagulation between particles during the subsequent calcination at high temperature.

Water-heating/solvent-heating refers to placing the precursor in water or ethylene glycol and heat-treating at approximately about 150 to about 250° C., by which ions on the surface of the particles settle at a thermodynamically stable position by passing through dissolution, recrystallization, surface diffusion, and the like. Therefore, even under a calcination process at a high temperature, a relatively weak reaction is exhibited compared to the precursors without the water-heating/solvent-heating process, suppressing the coagulation among particles.

Figure 1:
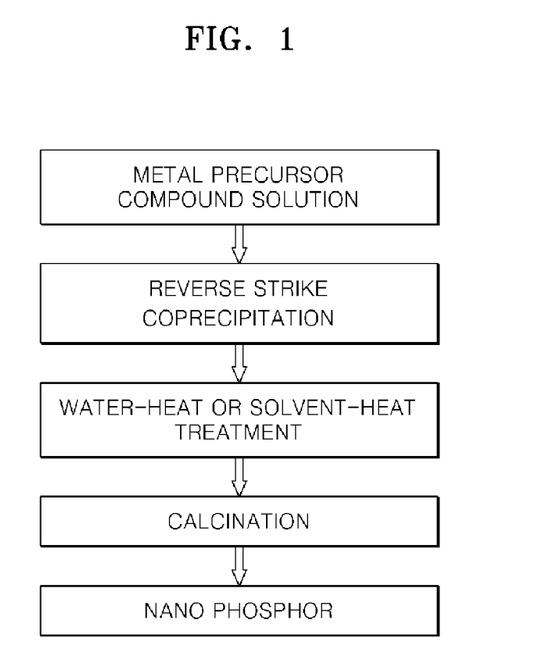
FIG. 1 is a schematic flowchart illustrating a method of preparing a nano phosphor.

FIG. 1 is a schematic flowchart illustrating a method of preparing a nano phosphor according to an embodiment of the present invention.

The present invention also provides a nano phosphor prepared using the method of preparing the nano phosphor of the present invention.

The present invention will now be described in more detail with reference to the following examples. However, these examples are for illustrative purposes only and are not intended to limit the scope of the invention.

EXAMPLES

Example 1

Preparation of Nano $(Sr_{0.88}Ca_{0.1}Eu_{0.02})_2P_2O_7$ Phosphor Treated with Water-Heat 1.07 grams (g) of $Sr(NO_3)_2$, 0.137 g of $Ca(NO_3)_2 \cdot 4H_2O$, and 0.03 g of $Eu_2O_3$ were added to 25 milliliters (ml) of distilled water, and 0.5 ml of 60% nitric acid solution was added to the mixture and stirred for 2 hours to produce a transparent aqueous solution 1. 0.768 g of $(NH_4)_2HPO_4$ was dissolved in 25 ml of distilled water to produce an aqueous solution 2, which was then added to the aqueous solution 1 and mixed. The pH of the mixed aqueous solution was 6.3. The precipitants were separated using centrifugation, and redispersed in 50 ml of distilled water, and then transferred to a 90 ml-Teflon container, and maintained at 180° C. for 5 hours using a stainless steel autoclave. The water-heat treated colloid was centrifuged, dried in an oven, and heat-treated under air atmosphere at 700° C. for 1 hour, then was heat-treated again under a reducing atmosphere having a flow ratio of $H_2/N_2=5:95$, at 900° C. for 1 hour to obtain a blue phosphor $(Sr_{0.88}Ca_{0.1}Eu_{0.02})_2P_2O_7$ having sub-micron sized particles.

Example 2

Preparation of Nano $(Sr_{0.88}Ca_{0.1}Eu_{0.02})_2P_2O_7$ Phosphors Treated with Solvent-Heat 1.07 g of $Sr(NO_3)_2$, 0.137 g of $Ca(NO_3)_2 \cdot 4H_2O$, and 0.03 g of $Eu_2O_3$ were added to 25 ml of distilled water, and 0.5 ml of 60% nitric acid solution was added to the mixture and stirred for 2 hours to produce a transparent aqueous solution 1. 0.768 g of $(NH_4)_2HPO_4$ was dissolved in 25 ml of distilled water to produce an aqueous solution 2, which was then added to the aqueous solution 1 and mixed. The pH of the mixed aqueous solution was 6.5. The precipitants were separated using centrifugation, and redispersed in a mixture of 10 ml of distilled water and 40 ml of ethylene glycol, and then transferred to a 90 ml-Teflon container, and maintained at 180° C. for 5 hours using a stainless steel autoclave. The solvent-heat treated colloid was centrifuged, dried in an oven, and heat-treated under an air atmosphere at 700° C. for 1 hour, then was heat-treated again under a reducing atmosphere of $H_2/N_2=5:95$, at 900° C. for 1 hour to obtain a blue phosphor $(Sr_{0.88}Ca_{0.1}Eu_{0.02})_2P_2O_7$ having sub-micron sized particles.

Comparative Example 1

Preparation of Nano $(Sr_{0.88}Ca_{0.1}Eu_{0.02})_2P_2O_7$ Phosphors Not Treated with Water-Heat/Solvent-Heat 1.07 g of $Sr(NO_3)_2$, 0.137 g of $Ca(NO_3)_2 \cdot 4H_2O$, and 0.03 g of $Eu_2O_3$ were added to 25 ml of distilled water, and 0.5 ml of 60% nitric acid solution was added to the mixture and stirred for 2 hours to produce a transparent aqueous solution 1. 0.768 g of $(NH_4)_2HPO_4$ was dissolved in 25 ml of distilled water to produce an aqueous solution 2, which was then added to the aqueous solution 1 and mixed. The pH of the mixed aqueous solution was 6.3. The precipitants were separated using centrifugation, dried in an oven, and heat-treated under an air atmosphere at 700° C. for 1 hour, then was heat-treated again under a reducing atmosphere of $H_2/N_2=5:95$, at 900° C. for 1 hour to obtain a blue phosphor $(Sr_{0.88}Ca_{0.1}Eu_{0.02})_2P_2O_7$ having sub-micron sized particles.

Comparative Example 2

Preparation of $(Sr_{0.88}Ca_{0.1}Eu_{0.02})_2P_2O_7$ Phosphors Using a Solid-Phase Reaction Method Raw material powders of 4.385 g of $SrCO_3$, 0.435 g of $CaCO_3$, 0.153 g of $Eu_2O_3$, and 5 g of $(NH_4)_2HPO_4$ were mixed using a mortar for an hour. The mixed powders were placed in an alumina reaction vessel, and heat-treated at 1000° C. for 2 hours, and then were mixed using a mortar for approx. 30 minutes, and finally calcinated under an atmosphere of $H_2/N_2=5:95$ for 2 hours.

Comparative Example 3

Preparation of $(Sr_{0.88}Ca_{0.1}Eu_{0.02})_2P_2O_7$ Phosphors Using a Conventional Coprecipitation 1.07 g of $Sr(NO_3)_2$, 0.137 g of $Ca(NO_3)_2 \cdot 4H_2O$, and 0.03 g of $Eu_2O_3$ were added to 25 ml of distilled water, and 0.5 ml of 60% nitric acid solution was added to the mixture and stirred for 2 hours to produce a transparent aqueous solution 1. 0.566 g of $H_3PO_4$ was added to the aqueous solution 1 and thoroughly mixed to produce an aqueous solution 2. Precipitation occurred when pH was increased by adding an ammonia solution to the aqueous solution 2. The pH of the final aqueous solution mixture was 6.0. The precipitant was separated using centrifugation and redispersed in 50 ml of distilled water, and then transferred to a 90 ml Teflon container, and was maintained at 180° C. for 5 hours using a stainless steel autoclave. The water-heat treated colloid was centrifuged, oven-dried, and heat-treated under an air atmosphere at 700° C. for 1 hour, and then was heat-treated again under a reducing atmosphere of $H_2/N_2=5:95$ at 900° C. for 1 hour to obtain a blue phosphor $(Sr_{0.88}Ca_{0.1}Eu_{0.02})_2P_2O_7$ having sub-micron sized particles.

Figure 3:
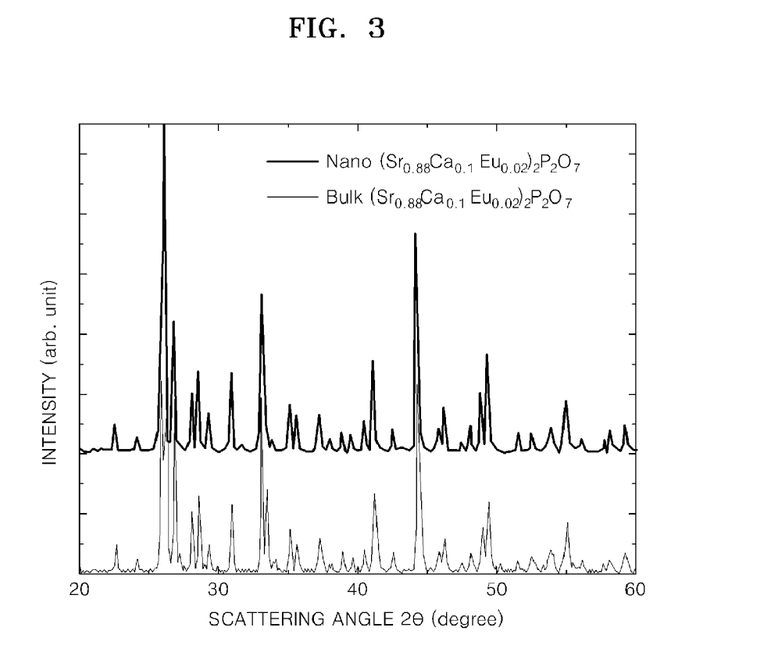
FIG. 3 is an XRD image illustrating an image-forming state of a nano phosphor (Sr$_{0.88}$Ca$_{0.1}$Eu$_{0.02}$)$_2$P$_2$O$_7$ according to an embodiment of the present invention, and a conventional bulk-sized phosphor (Sr$_{0.88}$Ca$_{0.1}$Eu$_{0.02}$)$_2$P$_2$O$_7$.

FIG. 3 is an XRD image illustrating an image-forming state of a nano phosphor $(Sr_{0.88}Ca_{0.1}Eu_{0.02})_2P_2O_7$ synthesized according to Example 1, and a conventional bulk-sized phosphor $(Sr_{0.88}Ca_{0.1}Eu_{0.02})_2P_2O_7$ synthesized according to Comparative Example 2.

Figure 4:
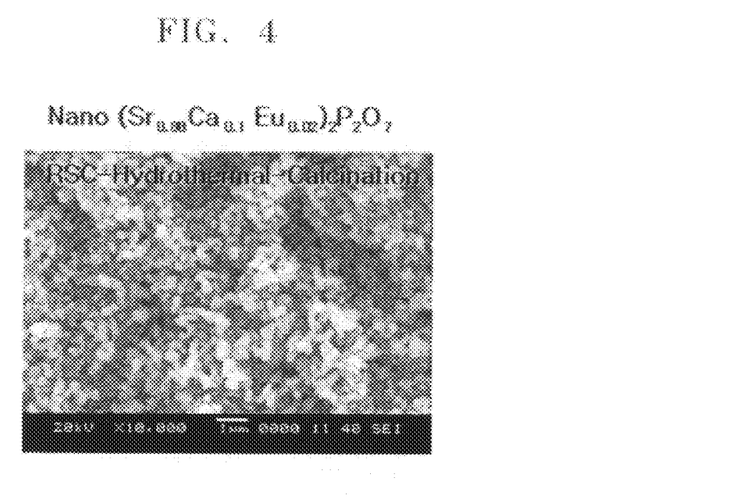
FIG. 4 is a scanning electron microscopic (SEM) image illustrating an overall distribution of particle sizes of nano phosphors according to another embodiment of the present invention.

FIG. 4 is a scanning electron microscopic (SEM) image illustrating an overall distribution of particle sizes of nano phosphor $(Sr_{0.88}Ca_{0.1}Eu_{0.02})_2P_2O_7$ synthesized according to Example 1.

Figure 5:
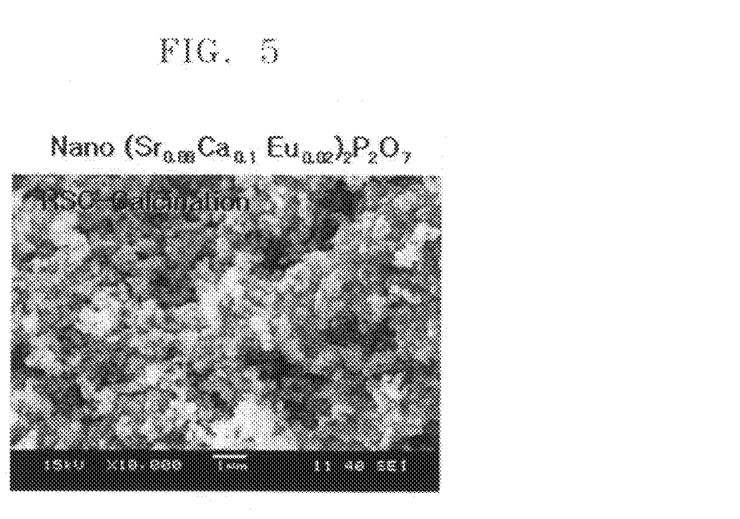
FIG. 5 is a SEM image illustrating the sizes and overall distribution of a phosphor (Sr$_{0.88}$Ca$_{0.1}$Eu$_{0.02}$)$_2$P$_2$O$_7$, which was calcined directly without undergoing water heating/solvent heating after the formation of precursors.

FIG. 5 is a SEM image illustrating the sizes and overall distribution of a phosphor according to Comparative Example 1, to which calcination was applied directly without undergoing water heating/solvent heating after the formation of precursors. The phosphor according to Comparative Example 1 exhibits coagulation between particles compared to the phosphor synthesized according to Example 1, despite the overall similarities in particle sizes.

Figure 6:
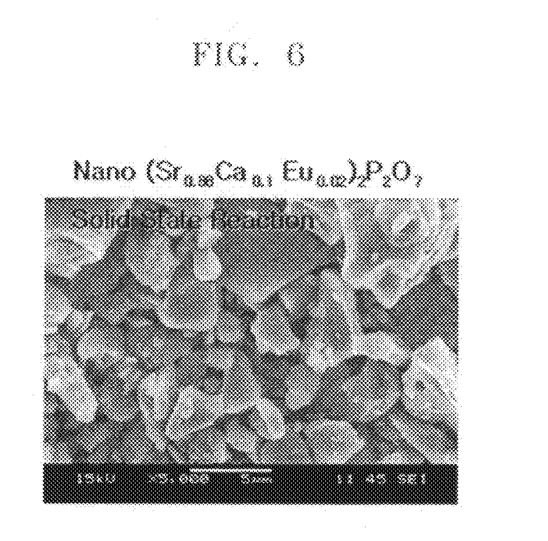
FIG. 6 is a SEM image illustrating the particle sizes and overall distribution of a conventional bulk-sized phosphor (Sr$_{0.88}$Ca$_{0.1}$Eu$_{0.02}$)$_2$P$_2$O$_7$.

FIG. 6 is a SEM image illustrating the particle sizes and overall distribution of a conventional bulk-sized phosphor $(Sr_{0.88}Ca_{0.1}Eu_{0.02})_2P_2O_7$ synthesized according to Comparative Example 2.

Figure 7:
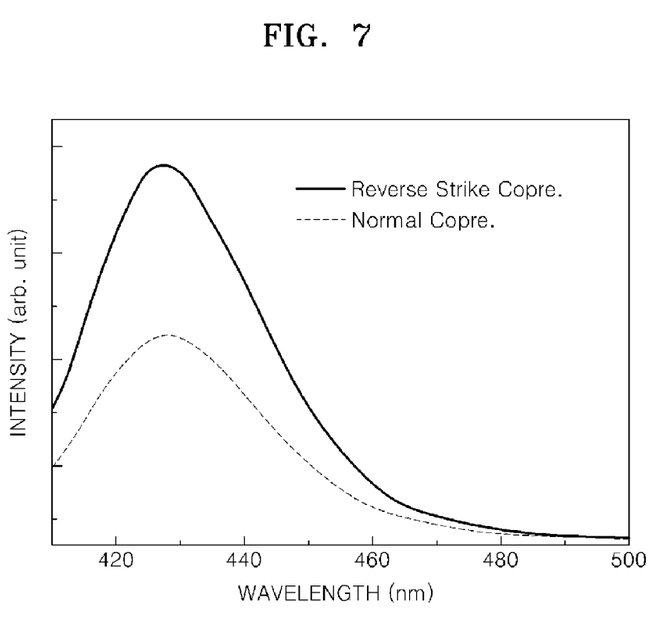
FIG. 7 is a graph illustrating an emission spectrum of (Sr$_{0.88}$Ca$_{0.1}$Eu$_{0.1}$)$_2$P$_2$O$_7$ phosphor synthesized by reverse strike coprecipitation (indicated as "copre." in the graph) as well as normal coprecipitation, and excited at 400 nm.

FIG. 7 is a graph illustrating light emission characteristics of $(Sr_{0.88}Ca_{0.1}Eu_{0.1})_2P_2O_7$ phosphor synthesized by reverse strike coprecipitation (Example 1), and $(Sr_{0.88}Ca_{0.1}Eu_{0.1})_2P_2O_7$ phosphor synthesized by conventional coprecipitation (Comparative Example 3). Under calcination conditions of the same temperature and duration, phosphors synthesized by reverse strike coprecipitation exhibit better brightness than those synthesized by conventional coprecipitation. This is due to the fact that reverse strike coprecipitation facilitates simultaneous nucleation of various metal ions, thereby promoting nucleation of phosphors with homogenous chemical composition.

The nano phosphor prepared using the method disclosed herein is nanometer-sized while having a homogenous chemical composition, and thus has superior light emission efficiency compared with conventional nano phosphors.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A phosphate nano phosphor with a mean particle diameter of about 100 to about 3000 nm, wherein a 10%-point of cumulative particle size distribution (D10) is about 200 nanometers and a 90%-point of cumulative particle size distribution (D90) is about 1000 nm.

2. The phosphate nano phosphor of claim 1, wherein the phosphate nano phosphor is a compound represented by Formula 1 below:

$$M_aP_bO_cA_d \quad \text{(Formula 1)}$$

wherein M is $M1_xM2_yM3_{(1-x-y)}$, and M1, M2, and M3 are each selected from the group consisting of Mg, Ca, Sr, Ba, Zn and Mn, and $0 \leq x \leq 1$, and $0 \leq y \leq 1$; A is $A1_zA2_wA3_{(1-z-w)}$, A1, A2, and A3 are each selected from the group consisting of F, Cl, Br, I, and OH, and $0 \leq z \leq 1$, and $0 \leq w \leq 1$; $1.5 < a < 5.5$, $1.5 < b < 3.5$, $6 < c < 13$, and $0 \leq d < 2$; and an activator is $B1_pB2_gB3_{(1-p-g)}$, and B1, B2, and B3 are selected from the group consisting of Eu, Mn, Ce, Pr, Dy, Tm, Tb, Yb, Sm, Er, Bi, Sb and Sn, and $0 \leq p \leq 1$ and $0 \leq g \leq 1$.

3. The phosphate nano phosphor of claim 2, wherein the phosphate nano phosphor represented by Formula 1 is selected from the group consisting of $Sr_2P_2O_7:Eu^{2+}$, $Sr_2P_2O_7:Eu^{2+}$, $Mn^{2+}$, $Sr_5(PO_4)_3Cl:Eu^{2+}$, $Sr_5(PO_4)_3(Cl,F):Eu^{2+}$, $Mn^{2+}$, $Sr_5(PO_4)_3Cl:Sn^{2+}$, $Sr_5(PO_4)_3Cl:Sb^{2+}$, $Sr_5(PO_4)_3(Cl,F):Sb^{2+}$, $Mn^{2+}$, $Ca_5(PO_4)_3Cl:Eu^{2+}$, $Ca_5(PO_4)_3(Cl,F):Eu^{2+}$, $Mn^{2+}$, and $Ca_3(PO_4)_2:Eu^{2+}$.

4. A method of preparing a nano phosphor, the method comprising:
dissolving two or more species of metal precursor compounds in water, and then adjusting the pH to prepare an aqueous solution having a pH of about 4 to about 10;
coprecipitating particles from the aqueous solution by mixing the aqueous solution with a phosphate precursor aqueous solution with the pH controlled at about 7 to about 12; and
redispersing the particles obtained from the coprecipitation in water or polyol solvent; and
heat treating the redispersed particles.

5. The method of claim 4, wherein the two or more species of metal precursor compounds are each selected from the group consisting of carbonates, nitrates, chlorides, hydroxides, oxalates, acetates, and oxides of Mg, Ca, Sr, Ba, Zn, Mn, Eu, Ce, Pr, Dy, Tm, Tb, Yb, Sm, Er, Bi, Sb and Sn.

6. The method of claim 4, wherein the phosphate precursor is selected from the group consisting of $(NH_4)_2HPO_4$, $NH_4H_2PO_4$, and $H_3PO_4$.

7. The method of claim 4, wherein the polyol solvent is selected from the group consisting of ethylene glycol, diethylene glycol, glycerol, and mixtures thereof.

8. The method of claim 4, wherein the heat-treating is performed at a temperature of about 150 to about 250° C.

9. The method of claim 8, further comprising drying and calcinating the particles after being heat treated.

10. The method of claim 9, wherein the calcination is performed under an air atmosphere or a reducing atmosphere of a mixed gas of $H_2$ and $N_2$ or Ar, at a temperature of about 700 to about 1300° C.

* * * * *